(12) United States Patent
Umminger

(10) Patent No.: US 12,330,100 B2
(45) Date of Patent: Jun. 17, 2025

(54) HIGHLY EFFICIENT FILTER MEDIUM

(71) Applicant: JOHNS MANVILLE, Denver, CO (US)

(72) Inventor: Jürgen Umminger, Lauda-Königshofen (DE)

(73) Assignee: Johns Manville, Denver, CO (US)

( * ) Notice: Subject to any disclaimer, the term of this patent is extended or adjusted under 35 U.S.C. 154(b) by 365 days.

(21) Appl. No.: 16/462,164

(22) PCT Filed: Dec. 18, 2017

(86) PCT No.: PCT/EP2017/083256
§ 371 (c)(1),
(2) Date: May 17, 2019

(87) PCT Pub. No.: WO2018/114764
PCT Pub. Date: Jun. 28, 2018

(65) Prior Publication Data
US 2019/0329169 A1 Oct. 31, 2019

(30) Foreign Application Priority Data
Dec. 21, 2016 (DE) .................... 10 2016 015 248.6

(51) Int. Cl.
*B01D 39/00* (2006.01)
*B01D 39/16* (2006.01)
*B01D 39/20* (2006.01)

(52) U.S. Cl.
CPC ....... *B01D 39/163* (2013.01); *B01D 39/2024* (2013.01); *B01D 2239/064* (2013.01); *B01D 2239/0668* (2013.01); *B01D 2239/086* (2013.01); *B01D 2239/1233* (2013.01)

(58) Field of Classification Search
CPC ...... B01D 2239/064; B01D 2239/0668; B01D 2239/086; B01D 2239/1233; B01D 39/00; B01D 39/163; B01D 39/2024
USPC .......................................................... 55/524
See application file for complete search history.

(56) References Cited

U.S. PATENT DOCUMENTS

| | | | | |
|---|---|---|---|---|
| 3,069,831 | A | * 12/1962 | Young | B01D 39/2017 210/493.1 |
| 5,993,501 | A | * 11/1999 | Cusick | B01D 39/202 428/184 |
| 2006/0242933 | A1 | * 11/2006 | Webb | B01D 46/521 55/486 |
| 2007/0175195 | A1 | * 8/2007 | Skirius | B01D 39/1623 55/527 |
| 2010/0107881 | A1 | * 5/2010 | Healey | B01D 39/202 55/486 |
| 2011/0174158 | A1 | * 7/2011 | Walls | D01D 5/0092 96/60 |
| 2013/0340398 | A1 | * 12/2013 | Battenfeld | B01D 39/163 162/146 |
| 2014/0130469 | A1 | * 5/2014 | Nagy | B01D 39/163 55/486 |
| 2015/0157969 | A1 | 6/2015 | Sealey et al. | |
| 2016/0038864 | A1 | * 2/2016 | Calcaterra | B01D 39/1623 210/483 |
| 2018/0001247 | A1 | * 1/2018 | Jinka | B01D 39/1623 |

FOREIGN PATENT DOCUMENTS

EP 2604322 A2 * 6/2013 ........... B01D 39/163

* cited by examiner

*Primary Examiner* — T. Bennett McKenzie
(74) *Attorney, Agent, or Firm* — Robert D. Touslee

(57) ABSTRACT

A filter is formed by a multilayer filter medium comprising at least one textile supporting layer, at least one filter layer which is applied to at least one side of the supporting nonwoven, wherein the filter layer is constructed from glass fibres, and at least one textile covering layer which is applied to the filter layer, wherein the filter layer comprises a mixture of at least two types of glass fibres, wherein the first glass fibre type of the mixture has a diameter of 0.6 µm±0.3 µm, and wherein the second glass fibre type of the mixture has a diameter of 1.0 µm±0.3 µm, and wherein the first and second glass fibre types of the mixture are present in a ratio by weight in the range 1:1.1 to 1:4.

20 Claims, No Drawings

HIGHLY EFFICIENT FILTER MEDIUM

BACKGROUND OF THE INVENTION

The present invention relates to a filter produced from a filter medium with a multi-median fibre distribution, to a method for its production and to the use of the filter in accordance with the invention.

The use of filters, in particular multilayer filter media, has been known for a long time. Thus, for example, air filters have been used for a long time in the automobile sector, in air conditioning systems, in passenger compartment filters, in pollen filters, in clean room filters, in domestic filters etc. Filters have also been used for a long time for filtering liquid media. Examples in this regard are oil filters and hydraulic filters.

Depending on the field of application, the filters have to be customized in order to obtain a sufficient filtration efficiency and service life. Thus, particle-air filters for general air conditioning technology (in accordance with EN 779) are used as coarse, medium and fine filters in air/gas filtration and also in liquid filtration, while high efficiency air filters (in accordance with EN 1822) are used in the EPA and HEPA (air) ranges or in water treatment.

U.S. Pat. No. 5,993,501 A discloses multilayer filter media and filters which consist of a stiff, pleatable base layer, the actual filter layer and a cover. These filters are particularly suitable for gas (air) and liquid filtration.

EP 1 134 013 A discloses multilayer pleated filter media and filters which consist of a stiff, pleatable base layer, the actual filter layer and a cover. These filters are constructed from polymeric melt bonded microfibres and are particularly suitable for gas (air) and liquid filtration.

EP 0 878 226 A discloses multilayer filter media and filters which are constructed from fine polymer fibres and glass fibres. These filters are particularly suitable for gas (air) and liquid filtration.

EP 1 656 981 A discloses filter media and filters which are constructed from fine glass fibres. These filters are particularly suitable for gas (air) and liquid filtration.

EP 2 604 322 discloses filter media and filters which are constructed from fine glass fibres. These filters are particularly suitable for gas (air) and liquid filtration.

BRIEF SUMMARY OF THE INVENTION

As already discussed, filter materials for air filtration are produced globally in accordance with DIN/EN 779 as well as ASHRAE 52.2 and are used in a multitude of applications. In high efficiency filters of this type, the filter efficiency and the pressure drop through the filter media are the parameters which essentially specify the filter. Increasing energy costs have now led to the development of a new assessment of what is known as energy efficiency of the filter. In Europe, this is now classified in accordance with EUROVENT 01/2015. This innovation led to the introduction of the energy efficiency class A+. The requirements imposed on the filter materials have increased so much that conventional filter media can no longer comply with these requirements as regards pressure difference/pressure drop and filtration efficiency.

Thus, there is a need for novel filter materials which comply with the newly formulated energy efficiency class A+ in accordance with EUROVENT 01/2015 and also can be produced with production units that are already available and also can be used without the customer having to customise them further.

Thus, the present invention provides a filter formed from a multilayer filter medium, comprising:
a) at least one textile supporting layer (layer 3), preferably a nonwoven layer, formed from synthetic polymer fibres, glass fibres or mixtures thereof, wherein
  a1) the textile supporting layer, preferably the nonwoven, has a basis weight of 10 to 300 g/m$^2$,
  a2) the fibres of the textile supporting layer, preferably of the nonwoven, have a diameter in the range 2 to 25 dtex for polymer fibres or a diameter of 0.5-15 µm for glass fibres,
  a3) the textile supporting layer, preferably the nonwoven, is consolidated by chemical binders or by thermoplastic binders,
  a4) the textile supporting layer, preferably the nonwoven, has an air permeability of at least 750 L/m$^2$ sec,
b) at least one filter layer (layer 2), which is applied to at least one side of the supporting nonwoven, wherein the filter layer is constructed from glass fibres and
  b1) the filter layer formed from glass fibres is a nonwoven, the basis weight of which is between 25 and 300 g/m$^2$,
  b2) the glass fibre nonwoven is consolidated by chemical binders,
  b3) the quantity of chemical binder which is applied is 5 to 30% by weight with respect to the basis weight of the filter layer (layer 2),
c) at least one textile covering layer (layer 1) which is applied to the filter layer in accordance with b), wherein the covering layer is formed from synthetic polymer fibres, and
  c1) the textile covering layer, preferably the nonwoven, has a basis weight of 20 to 100 g/m$^2$,
  c2) the fibres of the textile covering layer, preferably of the nonwoven, have a diameter in the range 2 to 25 dtex,
  c3) the textile covering layer, preferably the nonwoven, is consolidated by chemical binders or by thermoplastic binders,
  c4) the quantity of chemical binder or of thermoplastic binder which is applied is 5 to 25% by weight with respect to the basis weight of the covering layer (layer 1),
  c5) the textile covering layer, preferably the nonwoven, has an air permeability of at least 2500 L/m$^2$ sec, characterized in that the glass fibres forming the filter layer (layer 2)
  b4) comprise a mixture of at least two types of glass fibres,
  b5) wherein the first glass fibre type of the mixture in accordance with b4) has a diameter, determined as the mean value of a normal Gaussian distribution, of 0.6 µm±0.3 µm, and
  b6) wherein the second glass fibre type of the mixture in accordance with b4) has a diameter, determined as the mean value of a normal Gaussian distribution, of 1.0 µm±0.3 µm, and
  b7) wherein the first and second glass fibre types of the mixture in accordance with b4) are present in a ratio of 1:1.1 to 1:4 (by weight).

DETAILED DESCRIPTION OF THE INVENTION

Supporting Layer (Layer 3) and Covering Layer (Layer 1)

Nonwovens, woven fabrics, non-crimp fabrics, hosiery and knitted fabrics, preferably nonwovens because of their technical availability, may be used as the textile supporting layer or textile covering layer.

The textile supporting layer used in accordance with the invention is preferably a nonwoven supporting layer formed from synthetic polymer fibres, glass fibres or mixtures thereof which can be pleated.

The textile covering layer used in accordance with the invention is preferably a nonwoven covering layer formed from synthetic polymer fibres which can be pleated. Preferably, the textile covering layer, in particular the nonwoven covering layer, is formed from a variety of synthetic polymer fibres. Furthermore, the textile covering layer, in particular the nonwoven covering layer, may also be multi-layered in construction. In this regard, the individual layers may differ as regards the selected different synthetic polymer fibres and/or may have different fibre diameters.

The nonwovens may be wet laid nonwoven fabrics, spunbonded fabrics or dry laid nonwoven fabrics which are consolidated by chemical binding, as well as, if appropriate, by thermal and/or mechanical consolidation. The nonwovens are staple fibre nonwovens and/or spunbonded fabrics.

The preferred embodiments for the spunbonded fabrics described below are also applicable to staple fibre nonwovens.

Spunbonded fabrics, i.e. what are known as spunbonds, are produced from an entangled web of freshly melt-spun filaments. The filaments are continuous synthetic fibres formed from melt-spinnable polymer materials.

Examples of suitable polymer materials are thermoplastics, preferably polyamides such as, for example, polyhexamethylene diadipamide, polycaprolactam, aromatic or partially aromatic polyamides ("aramids"), aliphatic polyamides such as, for example, nylon, partially aromatic or fully aromatic polyesters, polycarbonates (PC), polyphenylene sulphide (PPS), polyphenylene oxide (PPO), polystyrene (PS), polyvinylcarbazole (PVK), polyacetal (POM), polyarylether, polyarylsulphone, polyethersulphone, polymers containing ether and keto groups such as, for example, polyetherketones (PEK) and polyetheretherketone (PEEK), polyolefins such as, for example, polyethylene or polypropylene, or polybenzimidazoles. Polyesters, polyolefins such as, for example, polyethylene or polypropylene, or aromatic or partially aromatic polyamides ("aramids"), aliphatic polyamides such as nylon, for example, are particularly preferred.

Preferably, the spunbonds comprise or consist of melt-spinnable polyesters. In principle, any known type of polyester material which is suitable for the production of fibres may be considered. Polyesters of this type primarily consist of components which derive from aromatic dicarboxylic acids and from aliphatic diols. Common aromatic dicarboxylic acid components are the divalent residues of benzodicarboxylic acids, in particular of terephthalic acid and of isophthalic acid; common diols contain 2 to 4 C atoms, wherein ethylene glycol is particularly suitable. Spunbonds which consist of at least 85 mol % polyethylene terephthalate are particularly preferred. The remaining 15 mol % is then made up of dicarboxylic acid units and glycol units, which act as what are known as modifiers and which enable the person skilled in the art to tailor the physical and chemical properties of the filaments which are produced. Examples of dicarboxylic acid units of this type are residues of isophthalic acid or of aliphatic dicarboxylic acids such as, for example, glutaric acid, adipic acid, sebacic acid; examples of modifying diol residues are those from long-chain diols, for example from propanediol or butanediol, from di- or tri-ethylene glycol or, as long as they are present in small quantities, of polyglycols with a molecular weight of approximately 500 to 2000.

Polyesters which contain at least 95 mol % polyethylene terephthalate (PET), in particular those from unmodified PET, are particularly preferred.

The polyesters contained in the spunbonds preferably have a molecular weight corresponding to an intrinsic viscosity (IV), measured in a solution of 1 g of polymer in 100 mL of dichloroacetic acid at 25° C., of 0.6 to 1.4.

In a further embodiment of the invention, the nonwoven, in particular the spunbond, may also be a hot melt bonded nonwoven material, i.e. consolidation is carried out using a thermoplastic binder which is preferably in the fibrous form. The hot melt bonded nonwoven material thus comprises carrier and hot melt adhesive fibres. The carrier and hot melt adhesive fibres may be derived from carrier fibres derived from any thermoplastic filament-forming polymers; they may also be derived from non-fusible filament-forming polymers. Fusible bonding spunbonds of this type are primarily described in EP 0 446 822 A and EP 0 590 629 A.

Examples of polymers from which the carrier fibres may be derived are polyacrylonitrile, polyolefins such as polyethylene or polypropylene, essentially aliphatic polyamides such as nylon 6.6, essentially aromatic polyamides (aramids) such as poly-(p-phenylene terephthalate) or copolymers containing a proportion of aromatic m-diamine units in order to improve the solubility or poly-(m-phenylene isophthalate), essentially aromatic polyesters such as poly(p-hydroxybenzoate) or, preferably, essentially aliphatic polyesters such as polyethylene terephthalate.

The proportion of both types of fibre with respect to each other may be selected within broad limits, but attention should be paid to selecting the proportion of hot melt adhesive fibres to be high enough to guarantee that the nonwoven material achieves a sufficient stiffness by bonding of the carrier fibres with the hot melt adhesive fibres for the desired application, but on the other hand that the required air permeability is guaranteed. The proportion of the hot melt adhesive originating from the hot melt adhesive fibres in the nonwoven material is usually less than 50% by weight (with respect to the weight of the nonwoven material).

In particular, modified polyesters with a melting point which is about 10° C. to 50° C., preferably 30° C. to 50° C. lower than that of the starting nonwoven material may be considered as the hot melt adhesive. Examples of hot melt adhesives of this type are polypropylene, polybutylene terephthalate or long-chain diols produced by condensation and/or polyethylene terephthalate modified by isophthalic acid or aliphatic dicarboxylic acids.

The hot melt adhesives are preferably introduced into the nonwovens in the form of fibres.

Preferably, the carrier and hot melt adhesive fibres are formed from one class of polymers. This should be understood to mean that all of the fibres used are selected from a single class of substances so that they can be recycled without problems following use of the nonwoven. As an example, if the carrier fibres consist of polyester, then the hot melt adhesive fibres are also selected from polyesters or from a mixture of polyesters, for example a two-component fibre with PET in the core and a lower melting point polyethylene terephthalate copolymer as the sheath. Furthermore, however, two-component fibres are possible which are formed from different polymers. Examples in this regard are two-component fibres formed from polyester and polyamide (core/sheath).

The individual fibre titre of the carrier and hot melt adhesive fibres may be selected from within the stated limits.

The filaments forming the nonwoven materials or staple fibres may have an almost round cross section, or may also have other shapes such as dumbbell-shaped, kidney-shaped, triangular or three- or multi-lobed cross sections. In addition, hollow fibres and bi- or multi-component fibres may also be used. Furthermore, the hot melt adhesive fibres may also be used in the form of bi- or multi-component fibres.

The fibres forming the nonwoven may be modified by the usual additives, for example by antistatic agents such as carbon black, or additives which allow an electrostatic charge to form. Furthermore, the fibres may have an antimicrobial finish.

In addition to the cited synthetic polymer fibres, glass fibres or mixtures of glass fibres and synthetic polymer fibres may be suitable as nonwoven-forming fibres.

Instead of glass fibres, mineral fibres based on aluminosilicates, ceramics, dolomite fibres or fibres from vulcanites such as, for example, basalt diabases, melaphyre diabases (dolerite) and melaphyres (what are known as paleobasalts) may be used. Preferably, however, glass fibres are used because of their economic availability.

There are no essential restrictions on what glass fibres can be used as the glass fibres in terms of the type of glass; thus, in principle, any glass type such as E glass, S glass, R glass, C glass may be used. For economic reasons, E glass or C glass is preferred. Biosoluble glasses are particularly preferred.

The glass fibres may be formed from filaments, i.e. continuous, long fibres, or from staple fibres. The average length of the staple fibres is preferably between 3 and 100 mm, in particular between 6 and 18 mm.

In the case of the supporting nonwoven, this may preferably be exclusively formed from glass fibres. Glass fibre supporting nonwoven of this type are also constructed from the glass fibres described above. The nonwovens may be produced with the aid of the known wet laid or dry laid processes.

The basis weight of the textile supporting layer, preferably of the nonwoven supporting layer, is between 10 and 300 g/m$^2$, preferably 20 and 250 g/m$^2$, in particular 20 and 100 g/m$^2$. In the case in which the textile supporting layer, preferably the nonwoven supporting layer, also comprises glass fibres, then the basis weight is between 25 and 300 g/m$^2$, preferably between 35 and 110 g/m$^2$.

The polymer/glass mixing ratios vary within wide limits and respectively amount to 0-100% by weight; preferably, the textile supporting layer, preferably the nonwoven supporting layer, consists of 100% glass. The diameter of the glass fibres is between 0.5-15 μm, preferably 8 to 15 μm. Particularly preferably, the nonwoven supporting layer consists of glass fibres.

The basis weight of the textile covering layer, preferably the nonwoven covering layer, is between 20 and 100 g/m$^2$, preferably between 25 and 55 g/m$^2$, in particular between 30 and 45 g/m$^2$.

Depending on the application profile for the filter, after production, the spunbonds forming the supporting nonwovens or covering nonwovens also undergo a hydrodynamic consolidation and/or thermal consolidation in addition to the chemical consolidation.

To this end, the hot melt consolidatable spunbonds, which also contain binder fibres in addition to carrier fibres, are thermally consolidated in a manner which is known per se using a roller or in an oven. The fibres may also have a two-component structure (for example core/sheath), in which the sheath is the binder polymer.

If the spunbonds do not contain binder fibres which are capable of thermal consolidation, then these spunbonds are impregnated with a chemical binder. In this regard, in particular, binders based on acrylates or styrenes may be considered. The binder fraction is advantageously up to 25% by weight, preferably 5 to 25% by weight. The precise choice of binder is made under consideration of the special field of interest of the fabricator.

In a further embodiment, flame-retarding modified binders may also be used or, in fact, the binders may be entirely dispensed with.

In a further embodiment of the invention, the supporting nonwoven or the covering nonwoven also has an embossing pattern formed by impressions with a small surface area which are randomly distributed or distributed in a repetitive pattern, preferably as spots, in which the impressed surface area, i.e. the totality of all of the sites of the spunbond which have been compacted, amounts to 5 to 30%, preferably 8 to 20% of its total surface area. In the case of hot melt bonded spunbonds, this embossing pattern may advantageously be applied during roller consolidation. If the supporting nonwoven is finally consolidated using a chemical binder, the embossing pattern may also be applied using a roller. This embossing pattern, which can be applied to both surfaces of the spunbond by passing the spunbond through a heated roller, but preferably is applied to only one surface of the spunbond, has a plurality of small impressions which have an extent of 0.2 to 4 mm$^2$, preferably 0.5 to 2 mm$^2$, and which are separated from each other by non-embossed elements of the surface area of the nonwoven of approximately the same size. The determination of the surface area of the compacted sites of the nonwoven and of the non-compacted sites of the nonwoven may be carried out, for example, by means of cross sectional measurements made under the microscope.

In a preferred embodiment, the supporting nonwoven and the covering nonwoven are consolidated without needling and solely by adding chemical binders.

In the case in which the supporting nonwoven or the covering nonwoven is formed from at least two different nonwovens, these are preferably joined to each other by mechanical and/or hydrodynamic needling. In addition to these methods, lamination of the various nonwoven layers may also be carried out by means of a roller.

In a preferred embodiment of the invention, the nonwoven supporting layer, in particular, however, the nonwoven covering layer, consists of 2 to 6 nonwoven layers, wherein the total basis weight mentioned above is retained. In the case in which the nonwoven covering layer has a multilayer construction, at least two of the nonwoven layers, preferably at least three of the nonwoven layers, are different.

The individual titre of the fibres formed from synthetic polymers which form the supporting nonwoven is between 2 and 25 dtex, preferably between 2 and 17 dtex.

The individual titre of the fibres formed from synthetic polymers which form the covering nonwoven is between 2 and 25 dtex, preferably between 2 and 17 dtex, particularly preferably between 2 and 10 dtex.

The supporting nonwoven in the filter in accordance with the invention has an air permeability of at least 750 L/m$^2$ sec. Preferably, the supporting nonwoven has an air permeability in the range 7000 to 11000 L/m$^2$ sec, measured respectively in accordance with DIN EN ISO 9237.

The nonwoven covering layer in the filter in accordance with the invention has an air permeability of at least 2500 L/m$^2$ sec, preferably an air permeability of more than 8500 L/m$^2$ sec, measured in accordance with DIN EN ISO 9237.

The covering layer has a filtration efficiency in class G1 to G4 (classification in accordance with EN 779).

Filter Layer (Layer 2)

The filter layer applied to the textile supporting layer usually consists of glass fibres. Instead of glass fibres, mineral fibres based on aluminosilicates, ceramics, dolomite fibres or fibres from vulcanites such as, for example, basalt diabases, melaphyre diabases (dolerite) and melaphyres (what are known as paleobasalts) may be used. Glass fibres are used because of their economic availability.

There are no essential restrictions to what glass fibres can be used as the glass fibres in terms of the type of glass; thus, in principle, any glass type such as E glass, S glass, R glass, C glass may be used. For economic reasons, E glass or C glass is preferred. Biosoluble glasses are particularly preferred.

The glass fibre nonwovens forming the filter layer (layer 2) are produced using known dry laid processes. To the person skilled in the art, dry and wet laid glass fibre nonwovens can be differentiated by their microscopic behaviour. Particularly preferably, the glass fibre nonwoven forming the filter layer (layer 2) is produced with the aid of the air media method (pot and marble process, see U.S. Pat. No. 5,993,501 A), which is also known to the person skilled in the art by the term "flame attenuation fibrization" process in which, by means of horizontally disposed burner nozzles, the glass fibres which are moving vertically downwards are further fused and pulled and laid as fine glass filaments. The fineness of the laid glass fibres is adjusted by means of the burner parameters (for example temperature, flow rate, pressure, fuel/O2 ratio) and is familiar to the person skilled in this art. With the aid of the air media method, nonwovens can be produced which are not accessible using the wet laid process.

The various fibre diameters in the filter medium are produced by means of the various process parameters for the burner. Because there is a sufficient distance between the burner and web mat, mixing of the glass fibres which are in flight occurs, therefore producing a distribution in the filter which is as homogeneous as possible.

The glass fibre nonwovens forming the filter layer (layer 2) comprise a mixture of at least two glass fibre types, wherein the first glass fibre type of the mixture has a diameter which is determined as the mean of a normal Gaussian distribution of 0.6 µm±0.3 µm, preferably ±0.2 µm, and the second glass fibre type of the mixture has a diameter which is determined as the mean of a normal Gaussian distribution of 1.0 µm±0.3 µm, preferably ±0.2 µm, and the first and second glass fibre types of the mixture are in a ratio by weight in the range 1:1.1 to 1:4, preferably 1:1.5 to 1:3, particularly preferably 1:2. Preferably, the difference between the aforementioned mean for the first glass fibre type and the aforementioned mean for the second glass fibre type is at least 0.3 µm, particularly preferably at least 0.4 µm.

In a preferred embodiment, the first and second glass fibre types of the mixture form at least 80% by weight of the fibres in the filter layer (layer 2), particularly preferably the first and second glass fibre types of the mixture form at least 98% by weight of the fibres in the filter layer (layer 2), and in particular, the first and second glass fibre types of the mixture form 100% by weight of the fibres in the filter layer (layer 2).

The glass fibre nonwoven forming the filter layer (layer 2) usually has chemical binders added to it during or after formation using the dry laid process (air media method).

The glass fibre nonwoven forming the filter layer (layer 2) preferably comprises fibres with a mean length of between 0.3 and 100 mm.

The glass fibre nonwoven forming the filter layer (layer 2) preferably contains between 5 and 30% by weight of chemical binders, with respect to the total weight of the filter layer after drying.

The glass fibre nonwoven forming the filter layer (layer 2) has a basis weight of between 25 and 300 g/m$^2$, preferably between 30 and 80 g/m$^2$.

The glass fibre nonwoven forming the filter layer (layer 2) preferably has a thickness of between 1 and 20 mm, in particular between 4 and 7 mm.

The glass fibre nonwoven forming the filter layer (layer 2) has an air permeability of at least 2500 L/m$^2$ sec, preferably an air permeability of more than 8500 L/m$^2$ sec, measured in accordance with DIN EN ISO 9237.

The glass fibre nonwoven has a filtration efficiency corresponding to class F7 to F9 (classification in accordance with EN 779).

The glass fibre nonwoven has a filtration efficiency corresponding to class M5 to M6 (classification in accordance with EN 779).

The production of the filter in accordance with the invention is carried out using methods which are familiar to and known to the person skilled in the art. Examples of suitable methods are disclosed in U.S. Pat. No. 5,993,501 A; the formation of spunbonds also lies within the standard knowledge of the person skilled in the art.

The filter is produced by forming the textile supporting layer (layer 3) or supplying the ready-formed textile supporting layer (layer 3). The textile supporting layer is preferably in the form of rolled goods. Subsequently, the filter layer (layer 2) is applied to this textile supporting layer as a dry laid nonwoven using the air media method. This is usually carried out directly onto the textile supporting layer (layer 3) by means of said air media method. In this regard, a chemical binder is applied at the same time as the glass fibres, usually using a spray process.

Preferably, the applied chemical binder is at least partially cured, so that consolidation is carried out. Subsequently, the textile supporting layer (layer 3) with the applied filter layer (layer 2) can be rolled up or processed further.

The preferred ranges for the materials involved have already been specified, and this is also applicable to the method.

In order to apply the textile covering layer (layer 1), the textile supporting layer (layer 3) with the applied filter layer (layer 2) can be unrolled and supplied directly during production of the covering layer (layer 1). Subsequently, the composite of the filter layer (layer 2) and textile supporting layer (layer 3) provided with the covering layer (layer 1) can be rolled up or processed further.

Alternatively, the filter can be produced by forming the textile covering layer (layer 1) or supplying the ready-formed textile covering layer (layer 1). The textile covering layer is preferably provided as rolled goods. Subsequently, the filter layer (layer 2) is applied as a dry laid nonwoven to this textile covering layer using the air media method. This is usually carried out directly onto the textile covering layer (layer 1) using said air media method. In this regard, a chemical binder is applied at the same time as the glass fibres, usually using a spray process.

Preferably, the applied chemical binder is at least partially cured so that consolidation occurs. Subsequently, the textile covering layer (layer 1) with the applied filter layer (layer 2) can be rolled up or processed further.

The preferred ranges for the materials involved have already been specified above, and apply mutatis mutandis to the method.

In order to apply the textile supporting layer (layer 3), the textile covering layer (layer 1) with the applied filter layer (layer 2) may be unrolled and supplied directly to the production of the supporting layer (layer 3).

Subsequently, the composite formed by the filter layer (layer 2) and the textile supporting layer (layer 3) provided with the covering layer (layer 1) can be rolled up or processed further.

The preferred ranges for the materials involved have already been specified above and apply mutatis mutandis to the method.

The entire composite formed by the supporting layer (layer 3), filter layer (layer 2) and textile covering layer (layer 1) is then bonded together in a roller oven or roller dryer for the purposes of fine adjustment and final consolidation, wherein the chemical binder is completely cured.

The filters in accordance with the invention are used in air/gas and liquid filtration, in particular in the automobile sector, in air conditioning systems, passenger compartment filters, pollen filters, clean room filters, domestic filters, as well as oil filters and hydraulic filters.

The filter in accordance with the invention, formed by a supporting layer (layer 3), filter layer (layer 2) and textile covering layer (layer 1), has an air permeability of at least 500 L/m² sec, preferably an air permeability of more than 1500 L/m² sec, measured in accordance with DIN EN ISO 9237. Please check.

The filters in accordance with the invention satisfy the energy efficiency class A+ of EUROVENT 01/2015.

The present invention also concerns filter modules or cartridges which contain the filter in accordance with the invention. In this regard, the filters are installed in the pleated form in housings or other casings. Relevant embodiments can be obtained from U.S. Pat. No. 5,883,501 A.

Further areas of application for the filter in accordance with the invention are in insulation and sound absorption panels.

Measurement Methods

DIN/EN779
 ASHRAE 52.2
EUROVENT 01/2015
 Energy efficiency class A+
 Air permeability: The determination of the air permeability was carried out in accordance with DIN EN ISO 9237:1995-12
 Basis weight: The determination of the basis weight was carried out in accordance with DIN EN ISO 29073-1: 1992-08.
 Fibre diameter: The fibre diameter was determined microscopically.

The invention claimed is:

1. A filter formed from a multilayer filter medium, comprising:
 a) a textile supporting layer formed from synthetic polymer fibers, glass fibres or mixtures thereof, wherein
  a1) the textile supporting layer has a basis weight of 10 to 300 g/m²,
  a2) the fibres of the textile supporting layer have a diameter in the range 2 to 25 dtex for polymer fibres or a diameter of 0.5-15 μm for glass fibres,
  a3) the textile supporting layer is consolidated by chemical binders or by thermoplastic binders,
  a4) the textile supporting layer has an air permeability of at least 750 L/m² sec,
 b) a filter layer formed from a nonwoven, the fibres of the fiber nonwoven consisting of glass fibres, wherein the filter layer is applied to at least one side of the textile supporting layer, wherein
  b1) the filter nonwoven has a basis weight of between 25 and 300 g/m²,
  b2) the fibre nonwoven is consolidated by chemical binders,
  b3) the quantity of chemical binder which is applied is 5 to 30% by weight with respect to the basis weight of the fibre nonwoven,
 c) a textile covering nonwoven which is applied to the filter layer opposite the textile supporting layer in accordance with b), wherein the textile covering nonwoven is formed from synthetic polymer fibres, and
  c1) the textile covering nonwoven has a basis weight of 20 to 100 g/m²,
  c2) the fibres of the textile covering nonwoven have a diameter in the range 2 to 25 dtex,
  c3) the textile covering nonwoven is consolidated by chemical binders or by thermoplastic binders,
  c4) the quantity of chemical binder or of thermoplastic binder which is applied is 5 to 25% by weight with respect to the basis weight of the covering nonwoven,
  c5) the textile covering nonwoven has an air permeability of at least 8500 L/m² sec,
  c6) the textile covering nonwoven is formed from two to six nonwoven layers that are coupled together, and at least two of the two to six nonwoven layers are different, characterized in that the fibres forming the fibre nonwoven
  b4) comprise a mixture of at least two types of glass fibres,
  b5) wherein the first glass fibre type of the mixture in accordance with b4) has a diameter, determined as the mean value of a normal Gaussian distribution, of 0.6 μm±0.3 μm, and
  b6) wherein the second glass fibre type of the mixture in accordance with b4) has a diameter, determined as the mean value of a normal Gaussian distribution, of 1.0 μm±0.3 μm, and
  b7) wherein the first and second glass fibre types of the mixture in accordance with b4) are present in a ratio of 1 to 1.1 to 1 to 2 (by weight).

2. The filter as claimed in claim 1, wherein the textile supporting layer is pleated.

3. The filter as claimed in claim 1, wherein, independently of each other, the textile supporting layer and/or the textile covering nonwoven is a wet laid nonwoven fabric, spunbonded fabric or dry laid nonwoven fabric.

4. The filter as claimed in claim 3, wherein the textile supporting layer and/or the textile covering layer comprises staple fibre nonwovens and/or spunbonded fabrics.

5. The filter as claimed in claim 1, wherein the textile supporting layer and/or the textile covering nonwoven is formed from thermoplastics.

6. The filter as claimed in claim 1, wherein the textile supporting layer has a basis weight of between 20 and 250 g/m².

7. The filter as claimed in claim 1, wherein the fibres of the textile supporting layer have a diameter in the range 2 to 17 dtex for polymer fibres or 8 to 15 μm for glass fibres.

8. The filter as claimed in claim 1, wherein the textile covering nonwoven has a basis weight of 25 to 55 g/m².

9. The filter as claimed in claim 1, wherein the fibres of the textile covering nonwoven have a diameter in the range 2 to 17 dtex.

10. The filter as claimed in 1, wherein the first and second glass fibre types of the mixture form at least 99% by weight of the fibres in the filter nonwoven.

11. The filter as claimed in claim 1, wherein the difference between the mean value for the first glass fibre type and the mean value for the second glass fibre type in the filter layer is at least 0.3 µm.

12. The filter as claimed in claim 1, wherein the filter nonwoven is a dry laid nonwoven.

13. The filter as claimed in claim 12, wherein the dry laid nonwoven is produced using the air media method.

14. The filter as claimed in claim 1, wherein the filter complies with the requirements for energy efficiency class A+ in accordance with EUROVENT 01/2015.

15. A method for the production of the filter as claimed in claim 1, comprising the following steps:
   a) forming the textile supporting layer or supplying the ready-formed textile supporting layer in the form of rolled goods,
   b) forming the filter layer directly on the textile supporting layer,
   c) optionally, rolling up the material obtained in accordance with step b) and unrolling it to carry out step d),
   d) forming the textile covering nonwoven or supplying the ready-formed textile covering nonwoven,
   e) rolling the material obtained in accordance with step d), or
   A) forming the textile covering nonwoven or supplying the ready-formed textile covering nonwoven in the form of rolled goods,
   B) forming the filter layer directly on the textile covering layer,
   C) optionally, rolling up the material obtained in accordance with step B) and unrolling it to carry out step D),
   D) forming the textile supporting layer or supplying the ready-formed textile supporting layer,
   e) rolling the material obtained in accordance with step D).

16. The method in accordance with claim 15, wherein the filter layer is produced using an air media method.

17. A filter module containing a housing and at least one filter as defined in claim 1.

18. The filter as claimed in claim 1, wherein:
the filter layer comprises a first outer surface and a second outer surface;
the textile supporting layer is coupled with the first outer surface; and
the textile covering nonwoven is coupled with the second outer surface such that each of the filter layer is sandwiched between textile supporting layer and the textile covering nonwoven.

19. The filter as claimed in claim 1, wherein:
the at least two of the two to six nonwoven layers that are different comprise one or both of different synthetic polymer fibres and fibres having different fibre diameters.

20. A filter formed from a multilayer filter medium, comprising:
a textile supporting layer formed from synthetic polymer fibres, glass fibres or mixtures thereof, wherein
   a1) the textile supporting layer has a basis weight of 10 to 300 g/m$^2$,
   a2) the fibres of the textile supporting layer have a diameter in the range 2 to 25 dtex for synthetic polymer fibres or a diameter of 0.5-15 µm for glass fibres,
   a3) the textile supporting layer is consolidated by chemical binders or by thermoplastic binders,
   a4) the textile supporting layer has an air permeability of at least 750 L/m$^2$ sec,
b) a single filter layer formed from a fibre nonwoven, the fibres of the fibre nonwoven consisting of glass fibres, wherein the filter layer is applied to at least one side of the textile supporting layer, wherein
   b1) the fibre nonwoven has a basis weight of between 25 and 300 g/m$^2$,
   b2) the fibre nonwoven is consolidated by chemical binders,
   b3) the quantity of chemical binder which is applied to 5to 30% by weight with respect to the basis weight of the fibre nonwoven,
c) a textile covering nonwoven which is applied to the filter layer opposite the textile supporting layer in accordance with b), wherein the textile covering nonwoven is formed from synthetic polymer fibres, and
   c1) the textile covering nonwoven has a bases weight of 20 to 100 g/m$^2$,
   c2) the fibres of the textile covering nonwoven have a diameter in the range of 2 to 25 dtex,
   c3) the textile covering nonwoven is consolidate by chemical binders or by thermoplastic binders,
   c4) the quantity of chemical binder or of thermoplastic binder which is applied is 5 to 25% by weight with respect to the bases weight of the textile covering nonwoven,
   c5) the textile covering nonwoven has an air permeability of at least 8500 L/m$^2$ sec,
   c6) the textile covering nonwoven is formed from two to six nonwoven layers that are coupled together, and at least two of the two to six nonwoven layers are different, characterized in that the fibres forming the nonwoven
   b4) comprise a homogenous mixture of at least two types of glass fibres,
   b5) wherein the first glass fibre type of the mixture in accordance with b4) has a diameter, determined as the mean value of a normal Gaussian distribution, of 0.6 µm±0.3 µm, and
   b6) wherein the second glass fibre type of the mixture in accordance with b4) has a diameter, determined as the mean value of a normal Gaussian distribution, of 0.1 µm±0.3 µm, and
   b7) wherein the first and second glass fibre types of the mixture in accordance with b4) are present in a ratio of 1 to 1.1 to 1 to 3 (by weight).

* * * * *